(12) United States Patent
Smithson

(10) Patent No.: US 7,605,933 B2
(45) Date of Patent: *Oct. 20, 2009

(54) APPROACH FOR SECURELY PROCESSING AN ELECTRONIC DOCUMENT

(75) Inventor: Brian Smithson, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 225 days.

This patent is subject to a terminal disclaimer.

(21) Appl. No.: 11/486,796

(22) Filed: Jul. 13, 2006

(65) Prior Publication Data

US 2008/0018925 A1    Jan. 24, 2008

(51) Int. Cl.
*G06K 15/00* (2006.01)
*G06F 3/12* (2006.01)

(52) U.S. Cl. ............. 358/1.14; 358/1.15; 358/1.13
(58) Field of Classification Search ........ 358/1.1, 358/1.2, 1.3, 1.4, 1.5, 1.6, 1.7, 1.8, 1.9, 1.11, 358/1.12, 1.13, 1.14, 1.15, 1.16, 1.17, 1.18, 358/407, 468, 400; 347/2, 3, 5, 14, 23; 399/1, 399/8, 9; 710/8, 10, 14, 15, 19, 62; 709/220, 709/221, 222; 713/1, 100

See application file for complete search history.

(56) References Cited

U.S. PATENT DOCUMENTS

| 5,619,684 | A * | 4/1997 | Goodwin et al. ........... 710/62 |
| 7,079,278 | B2 * | 7/2006 | Sato .................. 358/1.15 |
| 7,080,409 | B2 * | 7/2006 | Eigeles .................. 726/28 |
| 2005/0108548 | A1 | 5/2005 | Ohta |
| 2005/0219605 | A1 * | 10/2005 | Sato .................. 358/1.14 |
| 2008/0016548 | A1 * | 1/2008 | Smithson ................ 726/1 |
| 2008/0016549 | A1 * | 1/2008 | Smithson ................ 726/1 |
| 2008/0018925 | A1 | 1/2008 | Smithson |
| 2008/0123124 | A1 * | 5/2008 | Smithson ............... 358/1.13 |

* cited by examiner

*Primary Examiner*—Dov Popovici
(74) *Attorney, Agent, or Firm*—Hickman Palermo Truong & Becker LLP; Edward A. Becker

(57) ABSTRACT

A method and apparatus for processing an electronic document in a secure manner is provided. A client may verify that the configuration state of a document-processing device has not changed since a prior configuration state by issuing a request to a security server. The security server may process the request to determine whether the configuration state of the document-processing device has changed since the document-processing device was registered with the security server. The security server may also verify that a client issued a request to process an electronic document to a document-processing device or that the document-processing device received the request. A storage medium of a document-processing device may be protected against unauthorized removal of the storage medium by storing, separate from the storage medium, a password required to access the storage medium, and when the document-processing device is powered on, the password is provided to the storage medium.

15 Claims, 9 Drawing Sheets

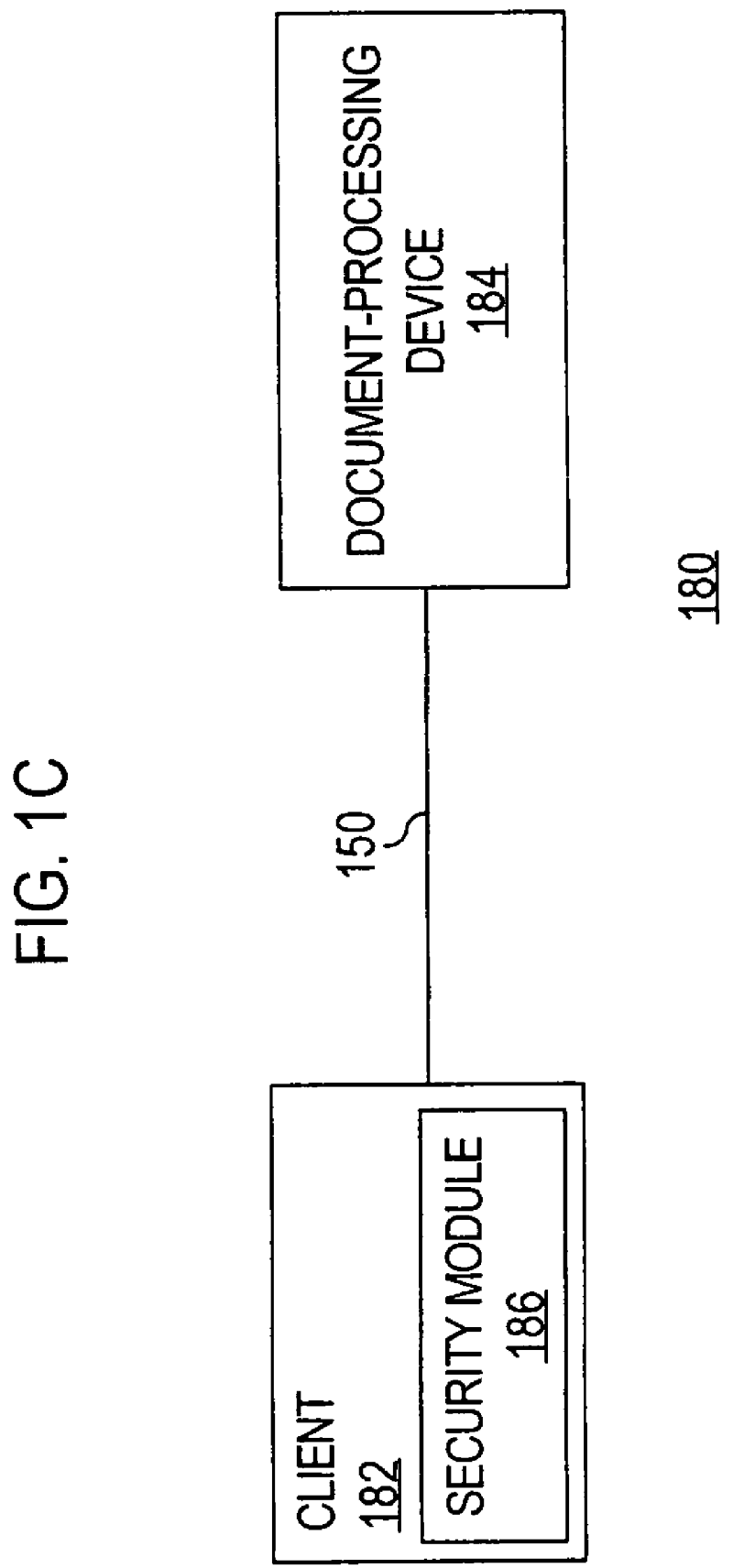

APPROACH FOR SECURELY PROCESSING AN ELECTRONIC DOCUMENT

FIELD OF THE INVENTION

The present invention relates to processing electronic documents in a secure manner.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A document-processing device is any device that processes either a printed copy of a document or an electronic copy of a document. A document-processing device may produce a printed copy of a document based on either an electronic copy of the document or another printed copy of the document. A document-processing device may also produce an electronic copy of a document based on either another electronic copy of the document or a printed copy of the document. Non-limiting, illustrative examples of a document-processing device include a printer, a scanner, a facsimile machine, a copier, and a multi-function peripheral (MFP).

In certain environments in which a document-processing device may be used, ensuring a certain level of security may be required or at least desirable. For example, the document-processing device may process documents containing sensitive information whose access needs to be restricted. The document-processing device may also be deployed in an environment in which it is desirable to monitor the activities of how the document-processing device is used as well as to verify that certain activities took place.

SUMMARY OF INVENTION

Approaches are discussed herein for processing electronic documents in a secure manner. In an embodiment, a client may verify that the configuration state of a document-processing device has not changed since a prior configuration state. For example, an administrator may register a document-processing device with a security server. A client may thereafter issue a request to the security server to determine if the configuration state of the document-processing device has changed since the document-processing device was registered with the security server. The configuration state of the document-processing device may reflect any way in which the document-processing device may be configured, e.g., the configuration state of the document-processing device may include a security state of the document-processing device. In this way, a client may verify that the security configuration of the document-processing device has not changed since the document-processing device was registered with the security server, thereby providing the client an assurance that the security of the document-processing device has not been compromised.

In another embodiment, the security server may be used to verify that certain events took place. For example, the security server may be used to verify that a particular client issued a request to process a particular electronic document to a particular document-processing device or that a particular document-processing device received a request, from a particular client, to process a particular electronic document.

In a further embodiment, a storage medium of a document-processing device, may be protected against unauthorized access. A password, used to control access to the storage medium, is stored at the document-processing device in a location separate from the storage medium. The storage medium is configured to require receipt of the password to access the storage medium. Upon powering on the document-processing device, the password is provided by the document-processing device to the storage medium, without user input, to allow the document-processing device to access the storage medium. In this way, if the storage medium is removed without authorization from the document-processing device, the storage medium cannot be accessed because the storage medium requires receipt of the password to access the storage medium.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 1C is a block diagram illustrating of an illustrative system according to a third embodiment of the invention;

DETAILED DESCRIPTION

In the following description, for the purposes of explanation, numerous specific details are set forth in order to provide a thorough understanding of the embodiments of the invention discussed herein. It will be apparent, however, that the embodiments of the invention discussed herein may be practiced without these specific details. In other instances, well-known structures and devices are shown in block diagram form in order to avoid unnecessarily obscuring the embodiments of the invention discussed herein.

System Overview

Various approaches are presented herein for processing electronic documents in a secure manner. According to one approach, a client may verify that the configuration state of a document-processing device has not changed since the document-processing device was registered with a security server. Embodiments of the invention may implement the functions performed by the security server differently, as explained in further detail below.

Figure 1A:
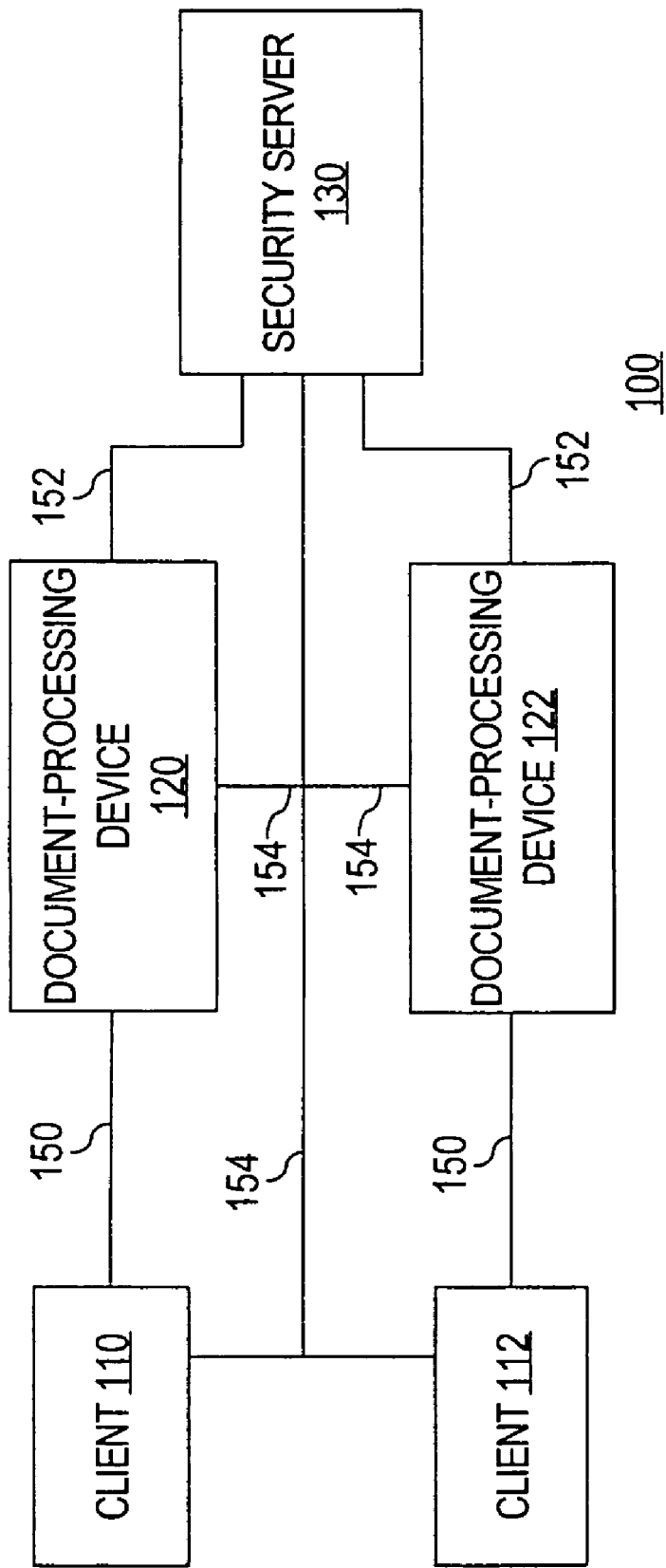
FIG. 1A is a block diagram illustrating of an illustrative system according to a first embodiment of the invention.

FIG. 1A is a block diagram illustrating of an illustrative system 100 according to a first embodiment of the invention. System 100 of FIG. 1A comprises clients 110 and 112, document-processing devices 120 and 122, security server 130, and communications links 150, 152, and 154.

A client, such as client 110 and client 112, as used herein, represents any device that is capable of issuing a request to process a document to a document-processing device over communications link 150. Non-limiting, illustrative examples of a client include a software application, a personal computer (PC), a wireless device, and a cell phone. While only two clients are depicted in FIG. 1A for ease of explanation, system 100 may include any number of clients, including one client and a plurality of clients.

A document-processing device, such as document-processing device 120 and document-processing device 122, as used herein, represents any device that processes either a printed copy of a document or an electronic copy of a document. Non-limiting, illustrative examples of a document-processing device include a printer, a scanner, a facsimile machine, a copier, and a multi-function peripheral (MFP). While only two document-processing devices are depicted in FIG. 1A for ease of explanation, system 100 may include any number of document-processing devices, including one document-processing device and a plurality of document-processing devices.

Security server 130 represents a device that is (a) capable of communicating with a client over communications link 154 and (b) capable of communicating with a document-processing device over communications link 152. Security server 130 is configured to perform security functionality. For example, security server 130 may service requests from clients to determine if the configuration state of a particular document-processing device has changed since the particular document-processing device was registered with security server 130. Security server 130 may also be used in verifying that certain actions performed in system 100 took place, such as a client issuing a request to process a document to a document-processing device. The actions performed by security server 130 shall be described in further detail below.

Communications link 150 may be implemented by any medium or mechanism that provides for the exchange of data between a client and a document-processing device. Communications link 152 may be implemented by any medium or mechanism that provides for the exchange of data between a document-processing device and a security server. Communications link 154 may be implemented by any medium or mechanism that provides for the exchange of data between a client and a security server. Non-limiting, illustrative examples of communications links 150, 152, and 154 include a network such as a Local Area Network (LAN), Wide Area Network (WAN), Ethernet or the Internet, or one or more terrestrial, satellite or wireless links.

Figure 1B:
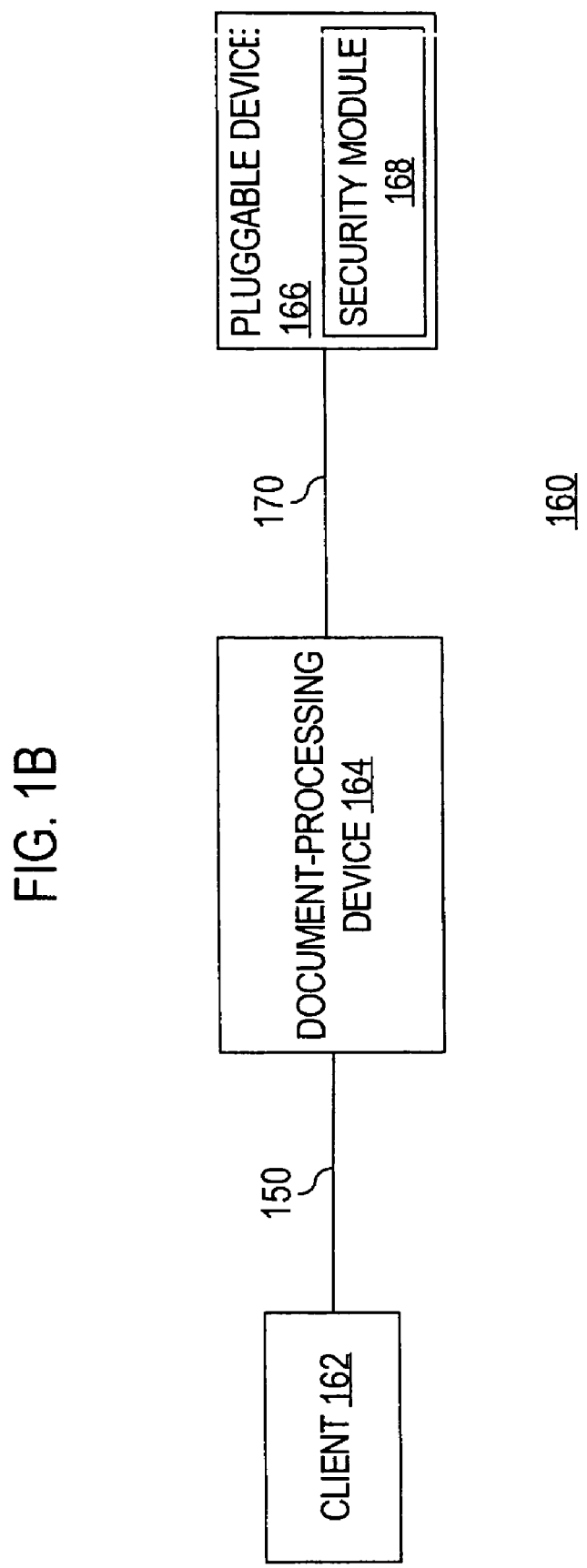
FIG. 1B is a block diagram illustrating of an illustrative system according to a second embodiment of the invention.

In some embodiments of the invention, the functions performed by security server 130 may be implemented on a device that is physically connected to a document-processing device. FIG. 1B is a block diagram illustrating of an illustrative system 160 according to such an embodiment of the invention. As shown in FIG. 1B, security module 168 is implemented on a pluggable device 166 that is physically connected (or "plugged in") to document-processing device 164 over communications link 170. Security module 168 corresponds to a functional component, such as a set of executable software instructions, on pluggable device 166 that performs the functions described herein as being performed by security server 130. While FIG. 1B depicts pluggable device 166 physically connected to a single document-processing device, in other embodiments of the invention, pluggable device 166 may be physically connected to two or more document-processing devices.

In other embodiments of the invention, the functions performed by security server 130 may be implemented on a client. FIG. 1C is a block diagram illustrating of an illustrative system 180 according to such an embodiment of the invention. As shown in FIG. 1C, security module 186 resides on client 182. Security module 186 corresponds to a functional component, such as a set of executable software instructions, on client 182 that is configured to perform the functions described herein as being performed by security server 130. In other embodiments of the invention (not depicted), security module 186 may be implemented on document-processing device 184.

Having described several illustrative systems, the process of verifying the configuration state of a document-processing device according to an embodiment shall now be described.

Verifying the Configuration State of a Document-Processing Device

Figure 2:
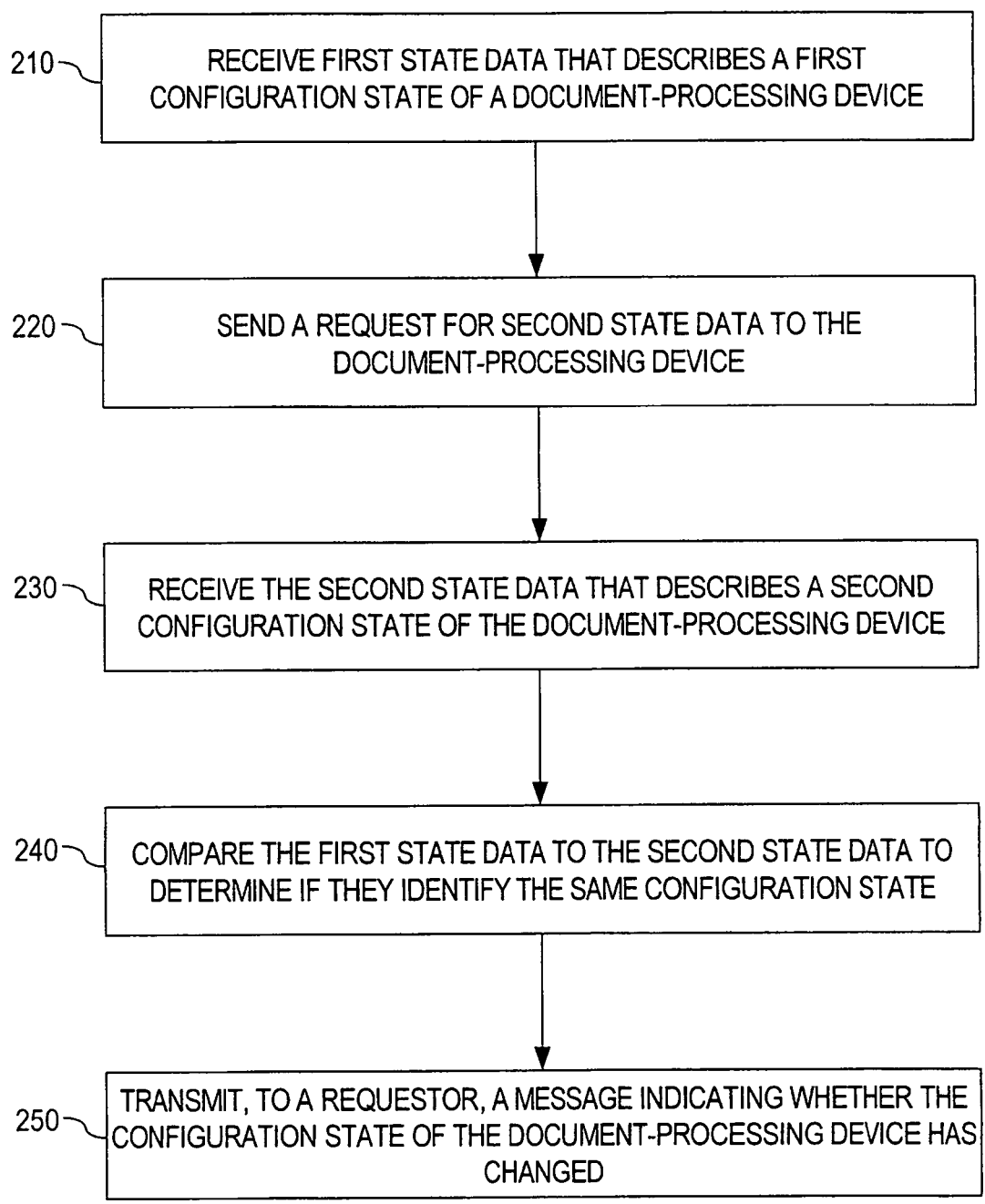
FIG. 2 is a flowchart illustrating the functional steps of determining whether a configuration state of a printing device has changed.

FIG. 2 is a flowchart illustrating the functional steps of determining whether a configuration state of a printing device has changed. For ease of explanation, the functional steps of FIG. 2 shall be explained below with reference to FIG. 1A. However, in other embodiments of the invention, the functions performed by security server 130 may be performed instead by a security module residing on a pluggable device, a client, or a document-processing device.

In step 210, first state data that describes a first configuration state of a document-processing device is received. A user, such as an administrator, may wish to register a particular document-processing device with security server 130. The act of registering a particular document-processing device with security server 130 involves retrieving first state data from the particular document-processing device, and storing the first state data with security server 130. For purposes of providing a clear example, the steps of FIG. 2 shall be explained below with reference to receiving first state data in step 210 that describes a first configuration state of document-processing device 120.

An administrator may use client 112 to send a request, to register document-processing device 120, to security server 130. In response to security server 130 receiving the request, security server 130 sends a request for the first state data to document-processing device 120. After document-processing device 120 receives the request from security server 130 for the first state data, document-processing device 120 prepares the first state data and transmits the first state data to security server 130.

The first state data may describe any configuration state of document-processing device 120. For example, the first state data may describe a security state of document-processing device 120. In other words, the first state data may identify the manner in which the security settings of document-processing device 120 are configured at the time when document-processing device 120 is registered with security server 130.

In an embodiment, document-processing device 120 may create the first state data using a hash function and/or a seed to obtain a hash value to use as the first state data. Such an approach may be advantageous, as it provides a level of encryption for the first state data, since the current configuration of document-processing device 120 cannot be inferred from inspecting the hash value. In such an embodiment, the first state data may be generated by document-processing device 120 (a) determining a set of configuration information that describes the configuration state of document-processing device 120, (b) hashing the configuration information using a hash function and/or a seed to obtain a hash value, and (c) using the hash value as the first state data. The hash function and/or the seed may be provided to document-processing device in the request for the first state data sent from security server 130, in a separate message from security server 130, or an administrator may provide the hash function and/or the seed to document-processing device 120. If security server 130 does not provide document-processing device 120 with the hash function and/or seed, then the hash function and/or seed used to encrypt the first state data may also be stored at security server 130.

Instead of or in addition to encrypting the first state data using a hash function, document-processing device 120 may encrypt the first state data using other approaches as well. For example, the first state data may be encrypted by document-processing device 120 using a public key associated with security server 130, and thereafter the first state data may be decrypted by security server 130 using a private key associated with security server 130. After security server 130 receives the first state data, processing proceeds to step 220.

In step 220, a request for second state data is sent by security server 130 to document-processing device 120. The request of step 220 may be performed in response to client 110 sending, to security server 130, a request to verify that the configuration state of document-processing device 120 has not changed since document-processing device 120 was registered with security server 130. The request to verify that the configuration state of document-processing device 120 may be sent automatically by client 110 after the occurrence of an event (such as when client 110 is powered on) or upon request of a user of client 110. Such a request may be advantageous to ensure that a particular document-processing device, to which client 110 wishes to send a request to process an electronic document, is secure. In this way, if the configuration state of a particular document-processing device has changed since it was registered with security server 130, then client 110, or a user of client 110, may determine that it may be too risky to issue a request to process an electronic document to that document-processing device since its configuration state has changed since it was registered; consequently, another document-processing device may be selected, either by client 110 or the user of client 110, to service a request to process the electronic document.

Second state data is data that describes a second configuration state of document-processing device 120. The second configuration state described by the second state data corresponds to the current configuration state of document-processing device 120.

In an embodiment, the request for second state data that is sent by security server 130 in step 220 is encrypted. For example, security server 130 may encrypt the request of step 220 using a public key associated with document-processing device, and upon receiving the request of step 220, document-processing device 120 can decrypt the request using a private key associated with document-processing device 120. After the request for the second state data is sent from the security server 130 to document-processing device 120, processing proceeds to step 230.

In step 230, the second state data is received from document-processing device 120 by security server 130. In an embodiment, the second state data may be encrypted by document-processing device 120 using the same techniques discussed above with reference to encrypting the first state data, e.g., the second state data may be encrypted using (a) a hash function and/or a seed and/or (b) a public key associated with security server. Thereafter, processing proceeds to step 240.

In step 240, the first state data received in step 210 and the second state data received in step 230 are compared by security server 130 to determine if the first state data and the second state data identify the same configuration state. If the first state data and the second state data identify the same configuration state, then the configuration state of document-processing device 120 has not changed since document-processing device 120 was registered. However, if the first state data and the second state data do not identify the same configuration state, then the configuration state of document-processing device 120 has changed since document-processing device 120 was registered. If the configuration of document-processing device 120 has changed since it was registered with security server 130, then the possibility exits that the change in configuration may result in document-processing device 120 being less secure.

If the configuration of document-processing device 120 has not changed since it was registered with security server 130, the first state data and the second state data are identical. For example, if the first state data and the second state data were created using a hash function and/or a seed, then the hash value for each of the first state data and the second state data should be the same, since the configuration information used to create the hash value in each case is the same. However, if the configuration information changed since document-processing device 120 was registered with security server 130, then the hash value of the second state data should be different than the hash value of the first state data, since the input to the hash function used to create the hash value in each case is different. After the first state data and the second state data are compared, processing proceeds to step 250.

In step 250, a message, indicating whether the configuration state of the document-processing device has changed, is transmitted by security server 130 to client 110. In an embodiment, upon client 110 receiving the message, client 110 may present the message to the user of client 110 to allow the user of client 110 to take some action, e.g., the user may subsequently instruct client 110 to issue a request to process an electronic document to document-processing device 120 anyway or may instruct client 110 to issue a request to process an electronic document to a different document-processing device.

In another embodiment, client 110 may be configured to interpret the message of step 250 to perform an action without presenting the message to the user. For example, in an embodiment, if client 110 reads the message of step 250, and the message indicates that the configuration state of the document-processing device 120 has changed, then client 110 may not allow the user of client 110 to issue a request to process an electronic document to document-processing device 120 and/or present a recommendation to the user of client 110 that the user of client 110 issue a request to process an electronic document to another document-processing device besides document-processing device 120.

Advantageously, a client may verify whether the configuration state of a document-processing device has been changed since the document-processing device has been registered with a security server. In this way, the client can determine whether a potential security risk exists due to a change in the configuration state of a document-processing device. Thus, if a client determines that the configuration state of a document-processing device has changed since the document-processing device was registered, then the client may perform one or more actions, as described above.

Figure 3:
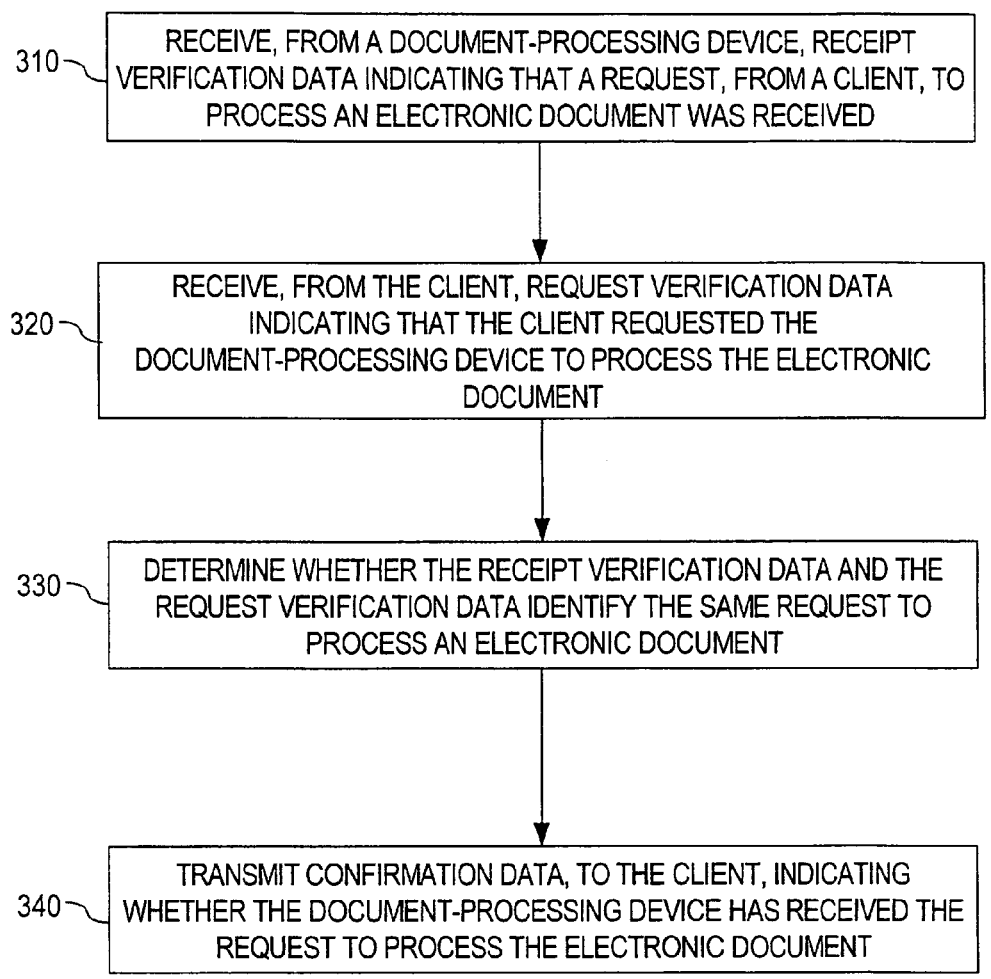
FIG. 3 is a flowchart illustrating the functional steps of verifying that a document-processing device has received a request, to process an electronic document, from a particular client according to an embodiment of the invention.

Verifying that a Document-Processing Device has Received a Request to Process an Electronic Document According to another approach for processing electronic documents in a secure manner, the receipt of a request, from a particular client, to a particular document-processing device, to process a particular electronic document may be verified. FIG. 3 is a flowchart illustrating the functional steps of verifying that a particular document-processing device has received a request, to process a particular electronic document, from a particular client according to an embodiment of the invention. For ease of explanation, the functional steps of FIG. 3 shall be explained below with reference to FIG. 1A. For purposes of providing a clear example, the steps of FIG. 3 shall be explained with reference to verifying that document-processing device 122 received a request, to process document ABC, from client 110.

In step 310, receipt verification data is received from document-processing device 122 by security server 130. Each time a document-processing device receives a request to process an electronic document from a client, the document-processing device may send receipt verification data to security server 130. The receipt verification data is data that indicates that a request, from a particular client, to process a particular electronic document at a particular document-processing device, was received by the particular document-processing device. Thus, in this example, the receipt verification data received in step 310 indicates that a request, from client 110, to process document ABC at document-processing device 122, was received by document-processing device 122. In some embodiments, receipt verification data may also contain other information about the request received by a document-processing device, e.g., the receipt verification data may also include a timestamp of when the request was received.

In an embodiment, document-processing device 122 may generate the receipt verification data to include information that identifies (a) document-processing device 122, (b) client 110, and (c) document ABC. Information contained in the receipt verification data that identifies document ABC may be generated by document-processing device 122 by applying a hash function to document ABC to generate a hash value.

In an embodiment, document-processing device 122 may encrypt the receipt verification data using any mechanism for encrypting data that security server 130 can decrypt. For example, document-processing device 122 may encrypt receipt verification data using a pubic key associated with security server 130, and security server 130 may decrypt receipt verification data using a private key associated with security server 130.

In an embodiment, the receipt verification data may include an encrypted copy of document ABC. As explained in further detail below, the encrypted copy of document ABC may be subsequently used by security server 130 in verifying that document-processing device 122 received the request from client 110 to process document ABC and in verifying the contents of document ABC.

In an embodiment, document-processing device 122 may send the receipt verification data to security server 130 in response to receiving the request to process document ABC from client 110. In another embodiment, document-processing device 122 may delay sending the receipt verification data to security server 130 for a configurable period of time or until a configurable number of requests to process documents have been received by document-processing device 122 so that receipt verification data for multiple requests may be sent from document-processing device 122 to security server 130 in a batch process or in single communication. After the receipt verification data is received from document-processing device 122, processing proceeds to step 320.

In step 320, request verification data is received from client 110 by security server 130. Request verification data is data that indicates that a particular client has issued a request to process a particular electronic document to a particular document-processing device. Thus, in this example, the request verification data received in step 320 indicates that client 110 has issued a request to process document ABC to document-processing device 122. Client 110 may transmit the request verification data to security server 130 in response to issuing the request to process a document identified by the request verification data. In other words, each time a client issues a request to process a document to a document-processing device, the client may also send request verification data to security server 130. In some embodiments, request verification data may also contain other information about a request, to process a document, issued by a client, e.g., the request verification data may also include a timestamp of when the request was issued.

In an embodiment, client 110 may generate the request verification data to include information that identifies (a) document-processing device 122, (b) client 110, and (c) document ABC. Information contained in the request verification data that identifies document ABC may be generated by client 110 by applying a hash function to document ABC to generate a hash value. In such an approach, the hash function used by client 110 is the same hash function used by document-processing device 122. As a result, the hash value computed by client 110 to identify document ABC should be the same as the hash value computed by document-processing device to identify document ABC.

Client 110 may encrypt request verification data using any mechanism for encrypting data that security server 130 can decrypt. For example, client 110 may encrypt request verification data using a public key associated with security server 130, and security server 130 may decrypt request verification data using a private key associated with security server 130. After security server receives the request verification data, processing proceeds to step 330.

In step 330, security server 130 determines whether the receipt verification data and the request verification data identify the same request to process an electronic document. Security server 130 may make this determination by inspecting the receipt verification data and the request verification data, although it may be necessary to decrypt the receipt verification data and the request verification data prior to inspection.

Embodiments may perform the comparison of step 330 in a variety of different approaches. According to one approach, all sets of receipt verification data and all sets of request verification data received by security stored are stored for a configurable amount of time by security server 130. Security server 130 may, upon receiving receipt verification data, determine if a set of request verification data that identifies the same request as the receipt verification data has been received. Similarly, security server 130 may, upon receiving request verification data, determine if a set of receipt verification data that identifies the same request as the request verification data has been received. In another approach, upon receiving either the receipt verification data or the request verification data, security server 130 may wait a configurable period of time before determining if a corresponding set of receipt verification data or request verification data has been received to allow enough time for the corresponding set of receipt verification data or request verification data to be received by security server 130.

In an embodiment wherein receipt verification data and request verification data is stored by security server 130 for a configurable period of time, a client may issue, to security server 130, a request to verify that a document-processing device received a request to process an electronic document some time after the client issued the request to the document-processing device. The client may issue a request ("a verification request") to verify whether the document-processing device received the request. The verification request from the client includes information to identify the particular request being verified, e.g., the request may include the request verification data. Security server 130 may then determine if any stored receipt verification data identifies the same request to process an electronic document as the request to process an electronic document identified by the verification request.

In an embodiment, if document-processing device 122 sent an encrypted copy of document ABC to security server 130 as part of the receipt verification data, then security server 130 may perform a three-way comparison between the receipt verification data, the request verification data, and server verification data. Server verification data is data that is generated by security server 130 from the copy of the document received from document-processing device 120. For example, if the receipt verification data and the request verification data each contain a hash value identifying document ABC, then security server 130 may apply the hash function to document ABC to generate its own hash value. Security server 130 may then compare the hash value contained in the receipt verification data, the hash value contained in the request verification data, and the hash value generated by security server 130 to ensure that each identifies the same document. After the comparison of step 330 is performed, processing proceeds to step 340.

In step 340, confirmation data, that indicates whether document-processing device 122 received a request, from client 110, to process document ABC, is sent from security server 130 to client 110. Advantageously, security server 130 may verify, either upon request or automatically after security server 130 receives either request verification data or receipt verification data, to client 110 that a particular document-processing device received the request to process a document from client 110.

Additionally, if document-processing device 122 sent an encrypted copy of document ABC to security server 130 as part of the receipt verification data, security server 130 may store the electronic document for a configurable period of time. In this way, security server 130 may provide a copy of the electronic document to a requester in response to receiving a request for the electronic document and/or in response to a verification request.

In an embodiment, in addition to verifying that a particular document-processing device received a particular request to process an electronic document from a particular client, information stored at security server 130 may be used in servicing requests from clients to obtain other information about requests to process the document, such as when a particular document-processing device received a particular request from a particular client. Having described an approach for verifying whether a document-processing device received a particular request to process an electronic document, techniques will now be discussed for verifying whether a client issued a particular request to process an electronic document.

Figure 4:
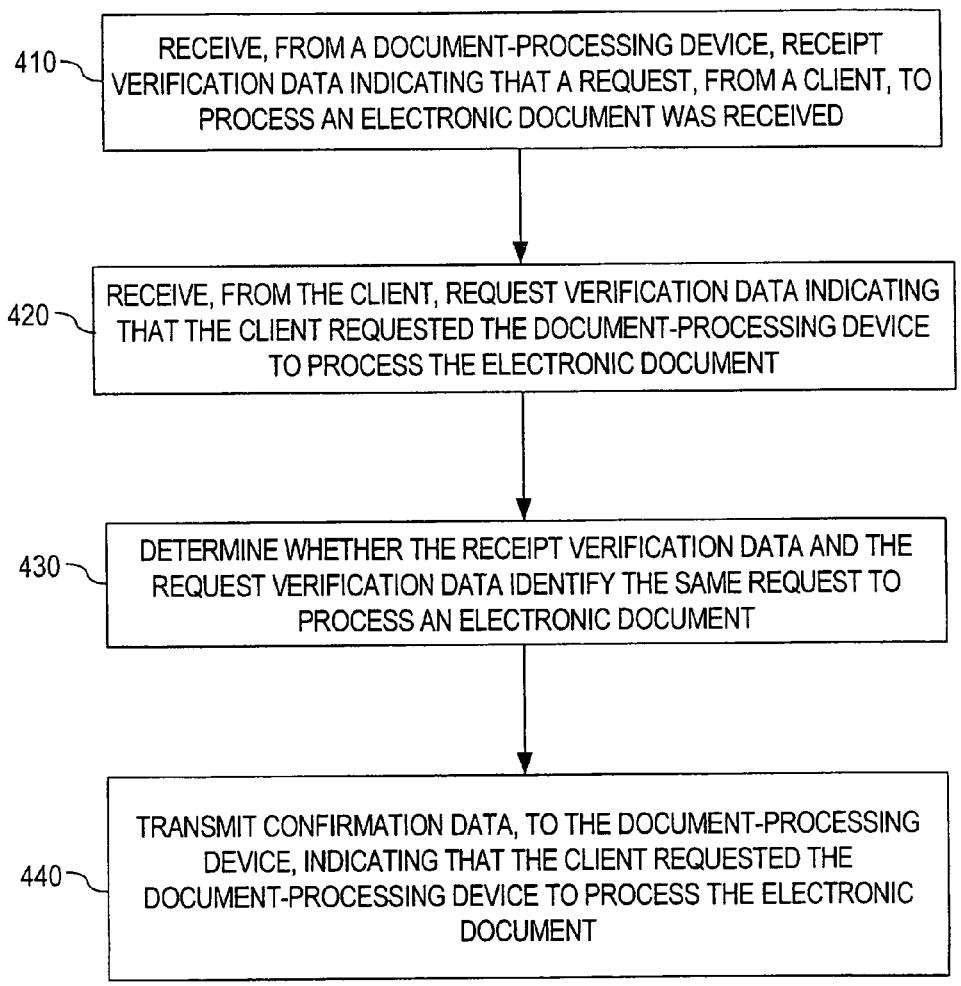
FIG. 4 is a flowchart illustrating the functional steps of verifying that a client requested an electronic document to be processed by a particular document-processing device according to an embodiment of the invention.

Verifying that a Client Issued a Request to Process an Electronic Document to a Document-Processing Device According to another approach for processing electronic documents in a secure manner, the issuance of a request to process a particular electronic document, by a particular client, to a particular document-processing device, may be verified. FIG. 4 is a flowchart illustrating the functional steps of verifying that a client requested an electronic document to be processed by a particular document-processing device according to an embodiment of the invention. For ease of explanation, the functional steps of FIG. 4 shall be explained below with reference to FIG. 1A. For purposes of providing a clear example, the steps of FIG. 4 shall be explained with reference to verifying that client 110 issues a request to process document ABC to document-processing device 122.

Steps 410, 420, and 430 of FIG. 4 are similar to those discussed above with respect to steps 310, 320, and 330 of FIG. 3 respectively. After the performance of step 430, processing proceeds to step 440.

In step 440, confirmation data, that indicates client 110 requested document-processing device 122 to process document ABC, is sent from security server 130 to another entity, such as document-processing device 122. In this way, the other entity, such as document-processing device 122, may verify that client 110 issued the request to process document ABC that was received by document-processing device 122. Document-processing device 122 may store received confirmation data for a configurable period of time. In this way, document-processing device 122 may prove the identity of client that sent request to document-processing device 122. For example, document-processing device 122 may provide a mechanism to a user, such as an administrator, to enable the user to access information about which clients issued requests to document-processing device 122 and information about those requests.

Additionally, client 112 may issue a request to security server 130 to verify that client 110 issued a particular request to document-processing device 122. In this way, clients may issue requests to security server 130 to verify that other clients issued a particular request to process an electronic document to a particular document-processing device. Such requests may need to be authenticated or be associated with a certain level of permission before the request is processed by security server 130.

In an embodiment, in addition to verifying that a particular client issued a particular request to a particular document-processing device, information stored at security server 130 may be used to service a request, from a client, to determine additional information, such as when a particular client issued a particular request, to process a document, to a particular document-processing device.

Having described an approach for verifying whether a document-processing device received a particular request to process an electronic document, techniques will now be discussed for verifying whether a client issued a particular request to process an electronic document.

Protecting a Storage Device of a Printing Device

Figure 5:
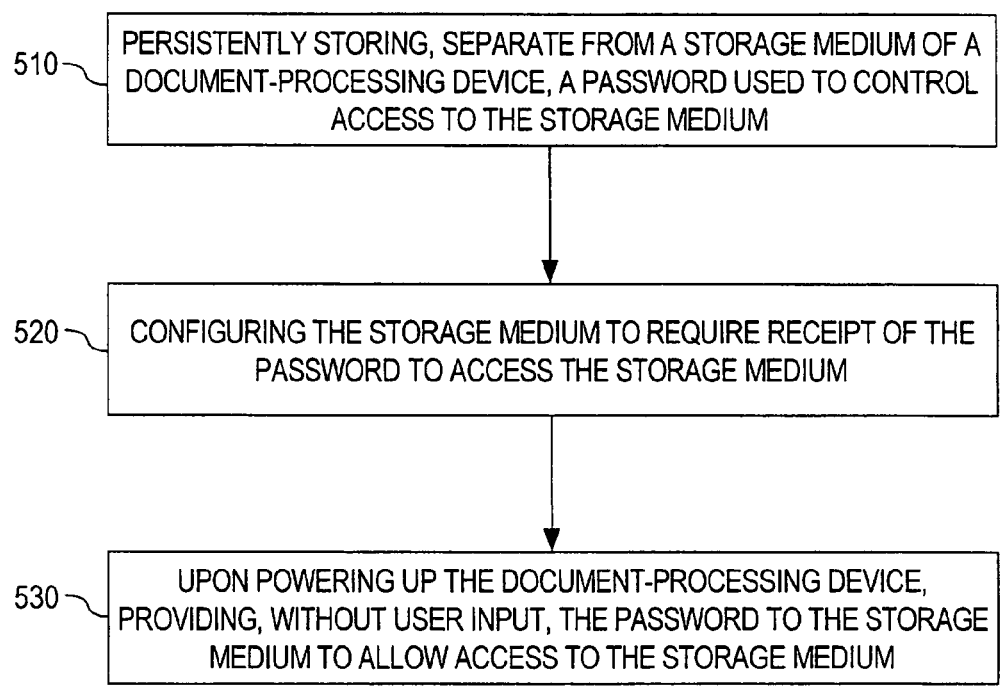
FIG. 5 is a flowchart illustrating the functional steps of protecting a storage medium of a document-processing device according to an embodiment of the invention.

According to another approach for processing electronic documents in a secure manner, a storage medium of a document-processing device, may be protected against unauthorized access. FIG. 5 is a flowchart illustrating the functional steps of protecting a storage medium of a document-processing device according to an embodiment of the invention. For ease of explanation, the steps of FIG. 5 shall be explained below with reference to FIG. 6, which is a block diagram of an illustrative document-processing device 610 according to an embodiment of the invention.

Document-processing device 610 comprises protected storage medium 620 and password storage medium 630. Protected storage medium 620 represents a persistent storage of document-processing device 610 that may be used to store sensitive information, such as information about the electronic documents that have been processed by document-processing device 610. A non-limiting, illustrative example of protected storage medium 620 includes a hard drive.

Password storage medium 630 represents a persistent storage of document-processing device 610 that may be used to store password 632. Although any mechanism for persistently storing data may be used to implement password storage medium 630, the capacity of password storage medium 630 need only be a large as to accommodate the persistent storage of password 632. A non-limiting, illustrative example of password storage medium 630 is flash memory. Password storage medium 630 may also be embodied as the storage medium storing the BIOS of document-processing device 610, as password 632 may also be stored by the BIOS of document-processing device 610.

Password 632 may be implemented using any data that may be used to control access to storage medium.

In step 510 of FIG. 5, password 632 is persistently stored separate from the storage medium. For example, password 632 may be stored in password storage medium 630.

In step 520, protected storage medium 620 is configured to require receipt of password 632 to access protected storage medium 620. As a result of configuring protected storage medium 620 to require receipt of password 632 to access protected storage medium 620, an entity cannot access protected storage medium 620 without providing password 632 to protected storage medium.

In an embodiment, protected storage medium 620 may be embodied using an Advanced Technology Attachment (ATA) hard drive. An ATA hard drive has a hard drive controller that is located on the ATA hard drive. The drive controller of an ATA hard drive may be configured to require receipt of a password in order to access the ATA hard drive. Thus, an ATA hard drive controller may be instructed in step 520 to require receipt of password 632 to allow access to protected storage medium 620.

In an embodiment, document-processing device 610 may automatically configure protected storage medium 620 to require receipt of password 632 to access protected storage medium in response to document-processing device 610 receiving a request to power down. In this way, protected storage medium 620 is "locked," in that if protected storage medium 620 is removed from document-processing device 610 prior to document-processing device 610 powering on, password 632 must be provided to protected storage medium 620 to access protected storage medium 620.

In step 530, upon powering up document-processing device 610, document-processing device 610 provides password 632 to protected storage medium 620 without user input, thereby "unlocking" protected storage medium 620. As document-processing device 610 provides password 632 to protected storage medium 620 upon powering up, document-processing device 610 may access protected storage medium 620.

Embodiments of the invention may advantageously be used to "lock" protected storage medium 620 when document-processing device 610 is powered down, thereby preventing unauthorized access to protected storage medium 620. As protected storage medium 620 is locked and unlocked without requiring any input or intervention from a user, the protection of protected storage medium 620 is transparent to a user of document-processing device 610. If sensitive information is stored on protected storage medium 620, and if protected storage medium 620 is removed when document-processing device 610 is powered down, then protected storage medium 620 cannot be accessed unless password 632 is provided, thereby providing any security that the sensitive information stored on protected storage medium 620 cannot be access by unauthorized personnel.

In an embodiment, the password used to control access to protected storage medium 620 may be changed each time document-processing device 610 is powered on. In such an embodiment, upon powering up document-processing device 610, a new password used to control access to protected storage medium 620 is generated. Thereafter, protected storage medium 620 is configured to (a) require receipt of the new password to allow access the protected storage medium 620, and (b) no longer require receipt of the previous password to allow access the protected storage medium 620.

In an embodiment, a master password may be used. A master password is a password which protected storage medium 620 will accept to provide access to protected storage medium 620. The drive controller of protected storage medium 620 may be configured to allow access to protected storage medium 620 if the master password is provided. In this way, if an administrator of document-processing device 610 needs to access protected storage medium 620, the administrator may access protected storage medium 620 with the master password. Such an embodiment is advantageous, as password 632 may be changed each time document-processing device 610 is powered on as explained above. In this way, if document-processing device 610 fails or a problem occurs in which document-processing device 610 is unable to retrieve password 632 from password storage medium 630, the administrator may use the master password to access protected storage medium 620. Thus, even though password 632 may not be retrievable from protected storage medium 620, the administrator may still gain access to protected storage medium 620 using the master password.

In an embodiment, an administrator may configure the operation of protected storage medium 620 by supplying the master password to the drive controller of protected storage medium 620. One manner in which the administrator may configure protected storage medium 620 is to (a) not permit data from being read from protected storage medium 620 by any entity other than document-processing device 610, but (b) allow data stored on protected storage medium 620 to be deleted. Such a configuration may be used when there is no need to recover the data stored on protected storage medium 620. For example, many document-processing devices only store documents for purposes of processing, and do not allow subsequent retrieval of stored document by other devices.

Inquiring About a User's Job Status

In an embodiment, a user may send a message to a document-processing device to obtain information about a job status. A user's job status, as used herein, generally refers to information about a request to process an electronic document that the user submitted to a document-processing device. A user's job status may include information about requests that are currently being processed by a document-processing device and may include information about requests that have already been processed by a document-processing device. In this way, a user may retrieve information about requests to processing electronic documents that the user previously sent to a document-processing device. In an embodiment, a user who is not an administrator may only inquiry about his own job status.

To illustrate the operation an embodiment of the invention, initially a user may user client 110 to send a status inquiry message to document-processing device 120. The status inquiry message contains identification information for the user that uniquely identifies the user, e.g., the identification information may include the user's username or other unique identifier. Additionally, the status inquiry message may identify those requests that the user is interested in receiving status information. For example, the status inquiry message may identify that the user wishes to receive status information only for pending requests or for requests that the user sent within a bounded period of time.

Upon receiving the status inquiry message, document-processing device 120 retrieves status information for the user in accordance with the status inquiry message. In an embodiment, document-processing device 120 uses the identification information contained in the status inquiry message to retrieve records containing the requested status information, which may be stored at document-processing device 120 or at security server 130. After retrieving the records containing the requested status information, document-processing device 120 sends the records containing the requested status information to client 110. Client 110 may then display the records containing the requested status information to the user.

In an embodiment, the records containing the status information may be stored (either at document-processing device 120 or at security server 130) in an encrypted manner, e.g., the records may be encrypted using the user's public key, and the user may decrypt the records using their private key. In an alternate embodiment, prior to returning the records to the user, document-processing device 120 may encrypt the records containing the requested status information. Other mechanisms for encrypting the records may be employed by other embodiments of the invention.

In an embodiment, an administrator may inquiry about the job status of any user. For example, an administrator may send a status inquiry message to document-processing device that requests the status of any number of users, including two or more users. Thus, an administrator may inquiry about the job status of another user besides the administrator. In such an embodiment, the status inquiry message sent by the administrator would contain identification information that uniquely identifies one or more users. In response to receiving the status inquiry message from an administrator, a document-processing device retrieves status information for each user identified in the status inquiry message, and thereafter sends the status information to the client from which the administrator sent the status inquiry message.

In an embodiment, prior to an administrator sending a status inquiry message that inquires about the status or another user, an administrator may need to be authenticated at the client. Alternately, prior to a document-processing device processing a status inquiry message, from an administrator, which inquires about the status or another user, the administrator may need to be authenticated at the document-processing device.

Verifying the Capabilities of a Document-Processing Device

In an embodiment, a client may verify that a particular document-processing device supports a particular feature. For example, a user may only wish to issue to a request to print an electronic document to a document-processing device that supports a desired security feature. Thus, an embodiment of the invention may be employed to confirm that a document-processing device supports the desired security feature prior to issuing a request to print the electronic document to the document-processing device.

To illustrate how an embodiment of the invention works in further detail, prior to client 110 sending a request to process an electronic document to document-processing device 120, client 110 sends a capability request message to document-processing device 120. Upon receiving the capability request message, document-processing device 120 sends capability information to client 110. The capability information describes the current capabilities of document-processing device 120 with respect to processing documents. For example, the capability information may describe the current security features of which document-processing device 120 is configured to provide.

Upon client 110 receiving the capability information from document-processing device 120, client 110 determines if the current capabilities of document-processing device 120 satisfy the desired requirements for a request to process an electronic document. If the current capabilities of document-processing device 120 do satisfy the desired requirements for a request to process an electronic document, then client 110 notifies the user that the desired capabilities were obtained, and sends the request to process the electronic document to document-processing device 120.

However, if the current capabilities of document-processing device 120 do not satisfy the desired requirements for a request to process an electronic document, then client 110 sends a change request, to document-processing device 120, to change the current capabilities of document-processing device 120 so that the capabilities satisfy the desired requirements for a request to process an electronic document. For example, the change request may specify that the security settings of document-processing device 120 be updated so that document-processing device 120 is configured to support a specified security feature. In response, document-processing device 120 will send, to client, a message indicating whether the current capabilities of document-processing device 120 may be updated in the manner requested by client 110 in the change request.

If the current capabilities of document-processing device 120 may be updated in the manner requested by client 110 in the change request, then client 110 reports to the user that the desired capabilities were obtained, and sends a message to document-processing device instructing document-processing device 120 to update its current capabilities in the manner requested by client 110 in the change request. In addition, thereafter client 110 sends the request to process the electronic document to document-processing device 120.

On the other hand, if the current capabilities of document-processing device 120 may not be updated in the manner requested by client 110 in the change request, then client 110 reports to the user that the desired capability were not obtained, and client 110 may await further instruction from the user. For example, the user may specify another document-processing device 120 to which a request to process an electronic document is to be sent, or may update the set of desired capabilities which are needed to process the electronic document. In this way, client 110 may be assured that the electronic document is processed by a document-processing device with the desired capability.

Implementing Mechanisms

Figure 6:
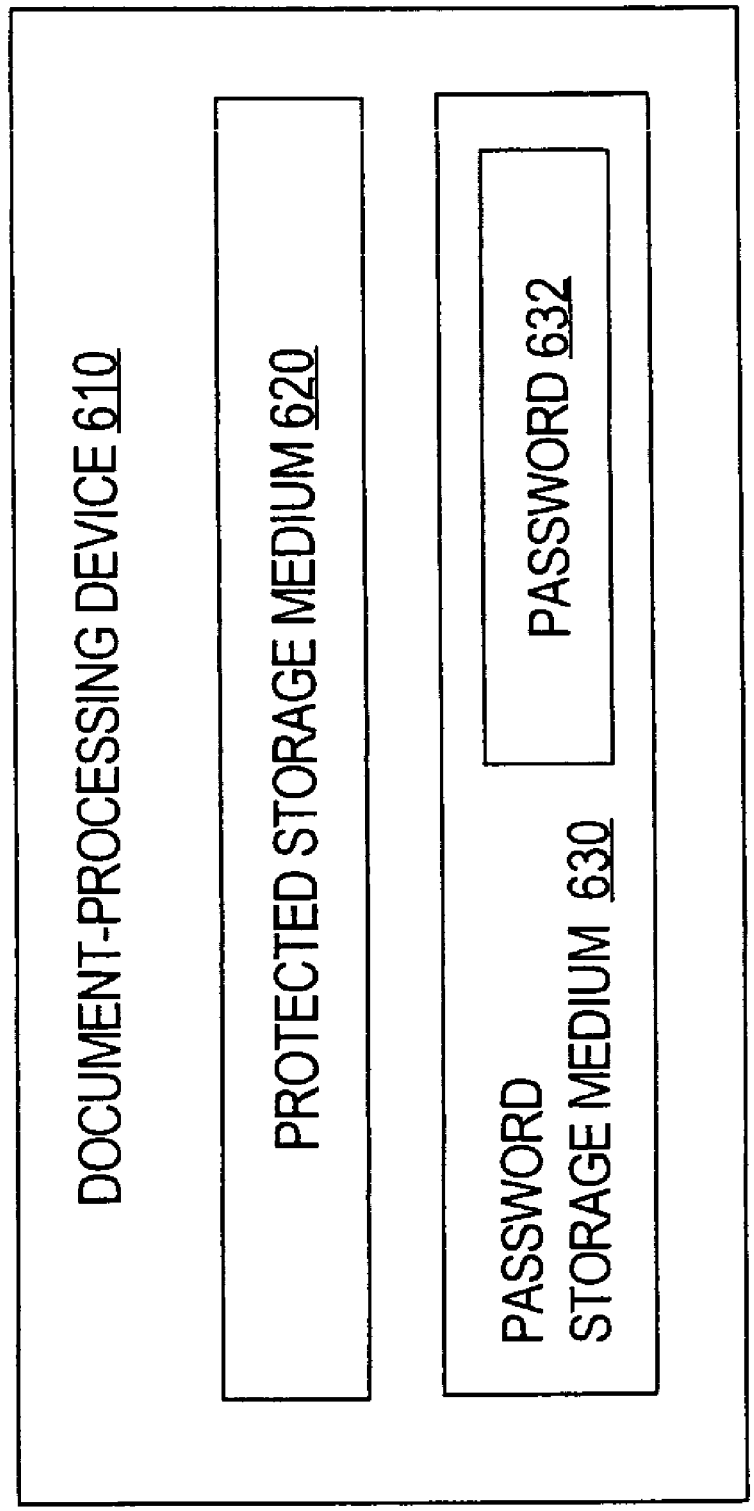
FIG. 6, which is a block diagram of an illustrative document-processing device according to an embodiment of the invention.
Figure 7:
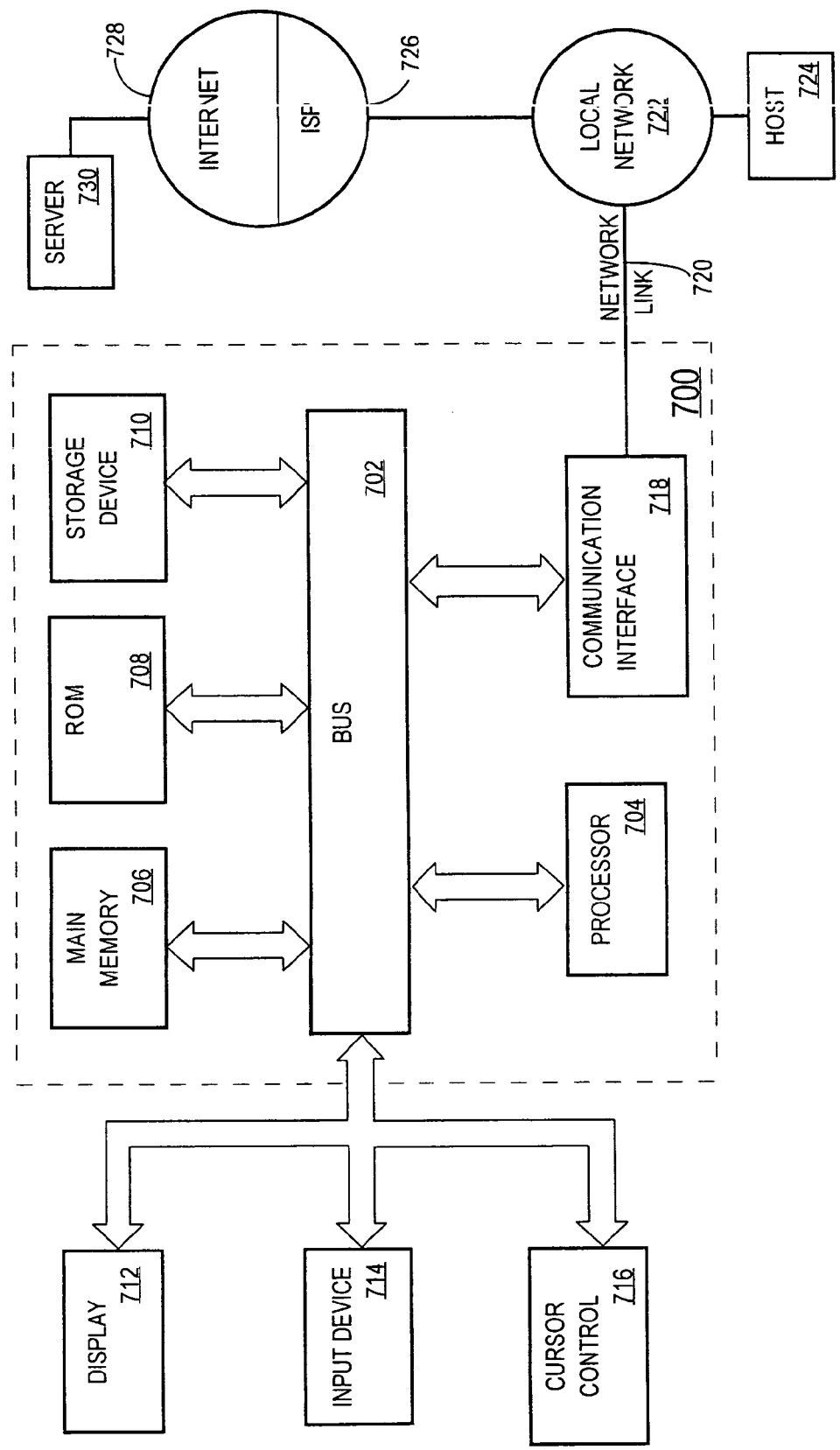
FIG. 7 is a block diagram that illustrates a computer system upon which an embodiment of the invention may be implemented.

A client, a document-processing device, a security server, and a pluggable device may each by embodied on a computer system. FIG. 6 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), a liquid crystal display (LCD), a plasma display, and a surface-conduction electron-emitter display (SED), for displaying information to a user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media and volatile media. Non-volatile media includes, for example, optical or magnetic disks, such as storage device 710. Volatile media includes dynamic memory, such as main memory 706. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correaction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for determining whether a configuration state of a document-processing device has changed, comprising:
   receiving, from the document-processing device, first state data that describes a first configuration state of the document-processing device;
   in response to receiving a request, from a requestor, to verify that the configuration state of the document-processing device has not changed since the first configuration state, sending a request for second state data to the document-processing device;
   receiving, from the document-processing device, the second state data that describes a second configuration state of the document-processing device, wherein the second state data is received subsequently to the receipt of the first state data;
   comparing the first state data with the second state data to determine if the first state data and the second state data identify the same configuration state of the document-processing device; and
   transmitting, to the requestor, a message indicating whether the configuration state of the document-processing device has changed since the first configuration state based on the comparison of the first state data with the second state data.

2. The method of claim 1, wherein the configuration state of the document-processing device includes a security state of the document-processing device.

3. The method of claim 1, wherein the first state data and the second state data are encrypted when received, and wherein the method further comprises:
   transmitting, to the document-processing device, information used in encrypting the first state data and the second state data.

4. The method of claim 1, further comprising: transmitting, to the document-processing device, a status inquiry message; and
   receiving, from the document-processing device, information about the status of a request to process an electronic document sent to the document-processing device.

5. The method of claim 1, further comprising:
   transmitting, to the document-processing device, a capability request message; and
   receiving, from the document-processing device, information about the current capabilities of the document-processing device.

6. A machine-readable medium carrying one or more sequences of instructions for determining whether a configuration state of a document-processing device has changed, wherein execution of the one or more sequences of instructions by one or more processors causes:
   receiving, from the document-processing device, first state data that describes a first configuration state of the document-processing device;
   in response to receiving a request, from a requestor, to verify that the configuration state of the document-processing device has not changed since the first configuration state, sending a request for second state data to the document-processing device;
   receiving, from the document-processing device, the second state data that describes a second configuration state of the document-processing device, wherein the second state data is received subsequently to the receipt of the first state data;
   comparing the first state data with the second state data to determine if the first state data and the second state data identify the same configuration state of the document-processing device; and
   transmitting, to the requestor, a message indicating whether the configuration state of the document-processing device has changed since the first configuration state based on the comparison of the first state data with the second state data.

7. The machine-readable medium of claim 6, wherein the configuration state of the document-processing device includes a security state of the document-processing device.

8. The machine-readable medium of claim 6, wherein the first state data and the second state data are encrypted when received, and wherein execution of the one or more sequences of instructions by the one or more processors further causes:
   transmitting, to the document-processing device, information used in encrypting the first state data and the second state data.

9. The machine-readable medium of claim 6, wherein execution of the one or more sequences of instructions by the one or more processors further causes:
   transmitting, to the document-processing device, a status inquiry message; and
   receiving, from the document-processing device, information about the status of a request to process an electronic document sent to the document-processing device.

10. The machine-readable medium of claim 6, wherein execution of the one or more sequences of instructions by the one or more processors further causes:
    transmitting, to the document-processing device, a capability request message; and
    receiving, from the document-processing device, information about the current capabilities of the document-processing device.

11. An apparatus for determining whether a configuration state of a document-processing device has changed, comprising:
    a machine-readable medium carrying one or more sequences of instructions; and
    one or more processors, wherein execution of the one or more sequences of instructions by the one or more processors causes:
    receiving, from the document-processing device, first state data that describes a first configuration state of the document-processing device;
    in response to receiving a request, from a requestor, to verify that the configuration state of the document-processing device has not changed since the first configuration state, sending a request for second state data to the document-processing device;
    receiving, from the document-processing device, the second state data that describes a second configuration state of the document-processing device, wherein the second state data is received subsequently to the receipt of the first state data;

comparing the first state data with the second state data to determine if the first state data and the second state data identify the same configuration state of the document-processing device; and transmitting, to the requestor, a message indicating whether the configuration state of the document-processing device has changed since the first configuration state based on the comparison of the first state data with the second state data.

12. The apparatus of claim 11, wherein the configuration state of the document-processing device includes a security state of the document-processing device.

13. The apparatus of claim 11, wherein the first state data and the second state data are encrypted when received, and wherein execution of the one or more sequences of instructions by the one or more processors further causes:

transmitting, to the document-processing device, information used in encrypting the first state data and the second state data.

14. The apparatus of claim 11, wherein execution of the one or more sequences of instructions by the one or more processors further causes:

transmitting, to the document-processing device, a status inquiry message; and receiving, from the document-processing device, information about the status of a request to process an electronic document sent to the document-processing device.

15. The apparatus of claim 11, wherein execution of the one or more sequences of instructions by the one or more processors further causes:

transmitting, to the document-processing device, a capability request message; and receiving, from the document-processing device, information about the current capabilities of the document-processing device.

* * * * *